Patented July 16, 1940

2,208,321

UNITED STATES PATENT OFFICE 2,208,321

PRODUCTION OF POLYCARBOXYLIC ACIDS AND ANHYDRIDES

Theodore F. Bradley, Stamford, Conn., assignor to American Cyanamid Company, New York, N. Y., a corporation of Maine No Drawing. Application November 25, 1935, Serial No. 51,498. Renewed May 14, 1938

7 Claims. (Cl. 260—78)

This invention relates to the production of polycarboxylic acids and anhydrides.

It is known that it is possible to produce certain dibasic acids and their anhydrides by the reaction of various terpenes of the $C_{10}H_{16}$ series with maleic acid or anhydride. In the case of those terpenes which contain a conjugate system of unsaturated carbon to carbon linkages or double bonds such as exists in the case of alpha-phellandrene, alpha-terpinene and Δ 3,8 (9) para menthadiene it is found that such react exothermally with maleic anhydried at relatively low temperatures to form various isomeric dibasic acid anhydrides of molecular weight 234. Other terpenes of the $C_{10}H_{16}$ series whose double bonds exist in a non-conjugated position such as for example limonene, dipentene, pinene, terpinolene and the like are not so reactive at room temperatures but when admixed with maleic anhydride and heated to about 170° C. are then found to rearrange and react most energetically forming mainly mixtures of the isomeric dibasic acid anhydrides of molecular weight 234. Smaller proportions of more complex polybasic acid anhydrides of higher molecular weight including some of tetra basic nature have been found to be formed under certain conditions and especially when the temperature is allowed to reach 150° C. or more. The primary reaction product, which may range from 70 to 95% in reactions of the aforesaid type, according to the particular terpene used and to the reaction conditions imposed on the system, consists of the isomeric dibasic acid anhydrides of molecular weight 234 and which correspond to the formula of $C_{14}H_{18}O_3$. These may exist in crystalline, liquid and even resinous forms according to the variations in structure and to the relative purity of the fractions. The anhydrides and the corresponding acids of this type are not as suitable for the preparation of certain polyhydric alcohol esters as are the anhydrides and acids of the present invention and moreover differ quite markedly from the latter in their physical and chemical nature.

I have found that it is possible to produce entirely new dibasic acid anhydrides and their corresponding acids by the reaction of polyterpenes with maleic anhydride. Diterpenes of molecular weight 272 and corresponding to the formula of $C_{20}H_{32}$ are particularly useful, although higher polymers may also be used.

In one specific embodiment of my invention, which is given merely by way of illustration, I prepare a poly-terpene by reacting 500 grams laevorotatory alpha-phellandrene with 270 cc. phosphoric acid by agitating the mixture for 168 hours in a sealed container. The reaction product is separated from the remaining phosphoric acid, washed free from acid and dried over anhydrous calcium chloride. The dry product is then filtered and distilled. The distillation removes the alpha and gamma terpinenes and leaves a residue of very high boiling "di-terpenes" with a yield of about 70% based on the original phellandrene.

The di-terpenes obtained as described may be used as such or may be fractionated, it being found that about 90% of the product can be distilled over at a temperature of between 125° C. and 200° C. at a pressure of 4 mm. Each fraction is progressively more viscous as the boiling temperature increases. That portion boiling at a temperature between 158° C. and 200° C. at 4 mm. was used in the succeeding reaction. This material represents the bulk of the di-terpenes prepared in the reaction and was found to have a refractive index of 1.5184 at 25° C., density 0.927 at $$\frac{25° C.}{15}$$

and to be dextro-rotatory.

A mixture is made of 49 parts by weight of maleic anhydride with 136 parts by weight of the di-terpene fraction described. This mixture is reacted in an open vessel at a temperature of about 200–215° C. for a period of about 3 hours. The product upon cooling is an amber-colored resin. This resin is purified by removing unreacted materials and traces of low molecular weight impurities by distillation treatment or by extraction with water to remove water-soluble materials, or by using both treatments.

The relatively non-volatile resinous residue obtained consists primarily of new di-carboxylic acid anhydrides of unsaturated nature. Chemically, these anhydrides are probably a mixture of isomers having the formula $C_{24}H_{34}O_3$, and having a molecular weight of 370. The product is characterized by freedom from liquid or crystalline dibasic acid anhydrides such as are formed in the reaction of mono-terpenes with maleic anhydride.

Another example of my method of preparing these new dibasic acid anhydrides is that in which 1250 parts by volume of wood turpentine is reacted with 425 parts by volume of phosphoric acid. This mixture is agitated for a period of about 24 hours. The reaction mixture becomes warm during the first hour due to the mildly exothermic nature of the reaction. The phosphoric acid is separated from the resulting poly-terpenes formed and such terpenes are then purified as in the previous example. The poly-terpenes were then subjected to distillation at 250° C. at atmospheric pressure. The distillate was discarded and the residue was distilled between 175° C. and 235° C. at a pressure of 17.5 mm. It possessed a refractive index of 1.5137 at 25° C. and density 0.9307 at $\frac{25}{15}$ and was optically inactive.

The distillate from the last named distillation was reacted with maleic anhydride in the proportions of 272 parts by weight of the former to 98 parts by weight of the latter. The reaction took place at 200°–220° C. over a period of 4 hours. As in the previous example there is produced a resinous material which is preferably purified by extraction and/or distillation. This product is of the same nature as that prepared in the first example and probably consists of a mixture of isomers having the formula $C_{24}H_{34}O_3$ and having a molecular weight of 370.

While I have illustrated my invention with the use of di-terpenes prepared from ordinary terpenes by the polymerizing action of phosphoric acid it is obvious that the smalled di and poly-terpenes prepared from ordinary terpenes by other isomerizing and polymerizing agents such as for example sulfuric acid, fuller's earth, stannic chloride and/or by other processes can be substituted and used providing only that they possess essentially the same or an analogous structure.

It is believed obvious that the present method may be carried out by the use of poly-terpenes other than those specified. Thus by reacting maleic anhydride with other poly-terpenes having the formula $(C_{10}H_{16})x$ where $x$ equals two or more, I may obtain similar resinous dicarboxylic acid anhydrides having the generic formula of $(C_{10}H_{16})x(C_4H_2O_3)$ and a molecular weight of 370 or more depending upon the value of $x$. In other words, the anhydrides prepared in accordance with my invention contain more than one $C_{10}H_{16}$ nucleus to each and every molecule of combined maleic anhydride or equivalent acid reagent.

My new dibasic acid anhydrides are useful for many purposes and are particularly adapted for the preparation of esters, especially where the esterification is carried out with polyhydric alcohols. The esterification of the acids with long chain glycols or poly-glycols produces flexible materials having great value in the manufacture of plastics or coating compositions. The long chain glycol poly-esters of these new acids are heat convertible materials and have sufficient flexibility to permit of their use as rubber substitutes or the like for certain purposes, such as in gaskets, floor coverings, insulation and the like.

The ability of the glycol esters of my new acid anhydrides to undergo a sol-gel transition and form infusible polymers upon extended heating at between 200°–250° C. is an important commercial advantage for many purposes and thus constitutes a prominent advantage compared to the non-heat-convertible esters such as are obtained from the mono-terpene acid anhydrides of the $C_{14}H_{18}O_3$ type. The glycerol and glycol esters of my new acid anhydrides may be modified with rosin, abietic and analogous acids, fatty acids, monoglycerides or glycolates of the fatty acids and the like just as in the case of other alkyd syntheses known to that art. Such modifications are particularly useful for the production of coating and impregnating compositions or for protective and decorative films. Other modifying agents such as the reactive and miscible forms of the phenol-formaldehyde or urea-formaldehyde condensates, vinyl and acrylic or methacrylic polymers and the like may also be admixed when desired.

While the acids or anhydrides of the present invention are best prepared for technical and economic reasons from maleic anhydride, maleic acid can also be used. Fumaric acid is much less reactive but may on occasion be desired, also other unsaturated acids or anhydrides of the type of citraconic, aconitic, itaconic, methyl maleic, cinnamic, crotonic, acrylic and methacrylic. The use of such diene reagents is not precluded but is to be regarded as within the scope of this invention. Likewise I include the condensation products of ethyl or other alkyl esters of maleic and related acids with di- and other polyterpenes. All of these acid diene reagents contain α, β- unsaturated organic acid radicals and they are all characterized as containing the grouping

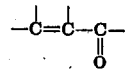

The acid anhydrides of the present invention may readily be combined with alkali metals to form the corresponding salts. These salts may then be hydrolyzed in aqueous solution or dispersion by means of mineral acids whereupon the new organic acids are precipitated in resinous form. These acids and their anhydrides are of unsaturated nature and are particularly useful as varnish and resin making materials. Various salts, esters, imides and amides of the new acids may be prepared and which are capable of further modification and use according to known processes.

It will be apparent that the present invention is subject to other variations and modifications without departing from the spirit thereof except as defined in the appended claims.

I claim:

1. A resinous dicarboxylic acid anhydride having the formula $C_{24}H_{34}O_3$ and a molecular weight of 370, and having the property of combining chemically with glycols to form esters which undergo a sol-gel transition and form infusible polymers upon extended heating between 200°–250° C.

2. A process which comprises reacting maleic anhydride with a di-terpene having the formula $C_{20}H_{32}$ until there is obtained dibasic acid anhydride having the formula of $C_{24}H_{34}O_3$ and molecular weight of 370.

3. The dibasic acids derived from the acid anhydrides of claim 1.

4. The process which comprises reacting by heating maleic anhydride with a diterpene until there is obtained a resinous acid anhydride, the average molecule of which contains in chemical combination more than one $C_{10}H_{16}$ terpene nucleus to each and every molecule of combined maleic anhydride.

5. Resinous polybasic acid anhydrides obtained from the reaction by heating a diterpene with maleic anhydride and which upon analysis are found to contain more than one $C_{10}H_{16}$ terpene nucleus to each and every molecule of combined maleic anhydride.

6. A resinous substance selected from the group consisting of dicarboxylic acid anhydrides having the formula $C_{24}H_{34}O_3$ and a molecular weight of 370 and the dibasic acid derived therefrom, said anhydrides and said acids having the property of combining chemically with glycols to form esters which undergo a sol-gel transition and form infusible polymers upon extended heating between 200°–250° C.

7. A process which comprises reacting by heating maleic anhydride with a diterpene until there is obtained a resinous acid anhydride, the average molecule of which contains in chemical combination more than one $C_{10}H_{16}$ terpene nucleus to each and every molecule of combined maleic anhydride, thereafter hydrolyzing said acid anhydrides to form corresponding resinous acids.

THEODORE F. BRADLEY.

DISCLAIMER 2,208,321.—*Theodore F. Bradley*, Stamford, Conn. PRODUCTION OF POLYCARBOXYLIC ACIDS AND ANHYDRIDES. Patent dated July 16, 1940. Disclaimer filed November 7, 1942, by the assignee, *American Cyanamid Company*.

Hereby enters this disclaimer to claims 2, 4, and 5.

[*Official Gazette December 8, 1942.*]